US010923153B2

(12) United States Patent
Clem et al.

(10) Patent No.: US 10,923,153 B2
(45) Date of Patent: *Feb. 16, 2021

(54) NON-LINEAR PROGRAM PLANNER, PREPARATION, AND DELIVERY SYSTEM

(71) Applicant: SCRIPPS NETWORKS INTERACTIVE, INC., Knoxville, TN (US)

(72) Inventors: Peter Clem, Knoxville, TN (US); Sarah Williams, Knoxville, TN (US); Deborah Cliburn, Knoxville, TN (US); Vinaya Verghese, Knoxville, TN (US); Jeannie Adair, Knoxville, TN (US); George Song, Knoxville, TN (US); Ali Moore, Knoxville, TN (US); Carrie Pierce, Knoxville, TN (US); Wade Chandler, Knoxville, TN (US); Robert Martin, Knoxville, TN (US); Kevin Barry, Knoxville, TN (US)

(73) Assignee: SCRIPPS NETWORKS INTERACTIVE, INC., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,429

(22) Filed: Jan. 29, 2020

(65) Prior Publication Data
US 2020/0168251 A1 May 28, 2020

Related U.S. Application Data

(63) Continuation of application No. 15/599,573, filed on May 19, 2017, now Pat. No. 10,580,455.
(Continued)

(51) Int. Cl.
*G06F 15/16* (2006.01)
*G11B 27/034* (2006.01)
(Continued)

(52) U.S. Cl.
CPC ............ *G11B 27/034* (2013.01); *G06F 21/10* (2013.01); *H04N 21/47202* (2013.01);
(Continued)

(58) Field of Classification Search
CPC ............ G11B 27/034; H04N 21/4821; H04N 21/8543; H04N 21/47202; G06F 21/10;
(Continued)

(56) References Cited

U.S. PATENT DOCUMENTS 6,345,239 B1    2/2002  Bowman-Amuah
8,775,258 B1 *  7/2014  Mick, Jr. .............. H04N 21/237
                                                        705/14.7
(Continued)

*Primary Examiner* — Hieu T Hoang
(74) *Attorney, Agent, or Firm* — J.A. Lindeman & Co. PLLC

(57) ABSTRACT

The non-linear program planner, preparation, and delivery system performs multiplatform planning and scheduling across multiple content delivery platforms. The system coordinates planning to deliver high-quality video content in a very efficient and scalable manner. The system includes automated avails and other processes that increases the accuracy of the information provided to distribution partners. The system checks on content rights and incorporates metadata structures that facilitate delivery of content to a wide range of distribution channels. The invention increases accuracy, timeliness, and efficiency of content delivered to partners and allows providers to generate revenue from online (non-linear) platforms and over the top (OTT) video services.

20 Claims, 13 Drawing Sheets
(10 of 13 Drawing Sheet(s) Filed in Color)

Related U.S. Application Data

(60) Provisional application No. 62/352,053, filed on Jun. 20, 2016.

(51) Int. Cl.
| | | |
|---|---|---|
| *H04N 21/472* | (2011.01) | |
| *G06F 21/10* | (2013.01) | |
| *H04N 21/482* | (2011.01) | |
| *H04N 21/8543* | (2011.01) | |
| *G06F 16/2457* | (2019.01) | |
| *G06Q 30/02* | (2012.01) | |

(52) U.S. Cl.
CPC ..... *H04N 21/4821* (2013.01); *H04N 21/8543* (2013.01); *G06F 16/24573* (2019.01); *G06F 2221/0786* (2013.01); *G06Q 30/0272* (2013.01); *G06Q 30/0277* (2013.01)

(58) Field of Classification Search
CPC ...... G06F 2221/0786; G06F 16/24573; G06Q 30/0277; G06Q 30/0272
See application file for complete search history.

(56) References Cited

U.S. PATENT DOCUMENTS

| | | | |
|---|---|---|---|
| 10,389,284 B2 | 8/2019 | Freire | |
| 2003/0070167 A1* | 4/2003 | Holtz | G06Q 30/0276 725/32 |
| 2006/0074754 A1 | 4/2006 | Toyohara et al. | |
| 2007/0014536 A1 | 1/2007 | Hellman | |
| 2007/0192516 A1 | 8/2007 | Ibrahim et al. | |
| 2007/0220566 A1 | 9/2007 | Ahmad-Taylor | |
| 2007/0245388 A1 | 10/2007 | Shen | |
| 2008/0070570 A1 | 3/2008 | Jiang | |
| 2009/0065571 A1 | 3/2009 | Jain | |
| 2009/0150930 A1* | 6/2009 | Sherwin | G11B 27/031 725/35 |
| 2010/0095324 A1 | 4/2010 | Schuster et al. | |
| 2010/0114715 A1 | 5/2010 | Schuster et al. | |
| 2010/0146542 A1* | 6/2010 | Weihs | H04N 21/2668 725/34 |
| 2010/0248719 A1 | 9/2010 | Scholaert | |
| 2013/0066670 A1 | 3/2013 | Krishnan Nair | |
| 2013/0204746 A1 | 8/2013 | Lee et al. | |
| 2013/0254041 A1* | 9/2013 | Sherwin | G06Q 30/02 705/14.68 |
| 2013/0276026 A1* | 10/2013 | Sherwin | G06Q 30/0269 725/35 |
| 2013/0336210 A1 | 12/2013 | Connor et al. | |
| 2014/0147096 A1 | 5/2014 | Fauqueur | |
| 2014/0157324 A1 | 6/2014 | Mao et al. | |
| 2014/0282682 A1 | 9/2014 | Samant et al. | |
| 2015/0358663 A1 | 12/2015 | Malone et al. | |
| 2015/0379626 A1 | 12/2015 | Choudhury et al. | |
| 2016/0119689 A1 | 4/2016 | Hood et al. | |

* cited by examiner

NL Video Asset Delivery Ecosystem 199

NON-LINEAR PROGRAM PLANNER, PREPARATION, AND DELIVERY SYSTEM

CROSS REFERENCE TO RELATED APPLICATIONS

This application is a continuation of U.S. patent application Ser. No. 15/599,573 filed on May 19, 2017, which claims the benefit of U.S. Provisional Application No. 62/352,053, filed on Jun. 20, 2016. This application incorporates by reference the entire contents of U.S. patent application Ser. No. 15/599,573 filed on May 19, 2017, and U.S. Provisional Application No. 62/352,053, filed on Jun. 20, 2016.

TECHNICAL FIELD

This technology relates to media asset management. More specifically, the technology relates to planning, preparing, and delivering non-linear video content to distribution partners for viewing on digital media players across many platforms.

BACKGROUND

Media content providers have a growing business of nonlinear video distribution. This demand is driven by the changing media consumptions of viewers. About 10 years ago, the only video distributed outside of the linear broadcast was Video on Demand (VOD) services provided by some multi-channel video programming distributors (MVPDs).

With the proliferation of devices, mobile operating systems, and fast changing viewing patterns, the MVPDs have expanded the VOD content to meet this viewer demand. Providers now put VOD on traditional set-top-boxes (STBs) and also on their browsers and mobile sites and applications. A product example of this is the TV-Everywhere product where the best content on cable television is available to consumers of pay TV via authenticated login across many devices and platforms.

As viewers shift to these other platforms, consumption of pay TV programs has declined. Content creators have had to adapt from creating compelling linear content that can move audiences and win ratings to providing that compelling content whenever and wherever audiences want to consume it and in technical formats that best suit the growing number of distribution platforms. Similarly, revenue from traditional Pay TV advertisements has also declined. In response, content creators, distributors, and advertisers investigate different avenues to recoup ad sales revenue as consumers watch video content on a variety of online platforms (e.g., mobile, desktop, connected TV devices, online stores, transactional Video On Demand, electronic-sell-through, and the like).

SUMMARY

The system of the claimed invention allows video content providers to plan, prepare, and deliver video content to a wide range of distribution partners. The non-linear program planner, preparation, and delivery systems allows content providers to perform multiplatform planning and scheduling across multiple content delivery platforms, including a variety of desktop and mobile computing devices, hardware architectures, and operating systems. The systems orchestrate end-to-end planning to deliver high-quality video content by automatically performing key portions of the processes in parallel to maximize efficiency. The systems include automated partner content avails and other processes that increase the accuracy of the information provided to distribution partners. The systems check on content rights and incorporate metadata structures that facilitate delivery of content to a wide range of distribution channels. The invention increases accuracy, timeliness, and efficiency of content delivered to partners (e.g., Google, Comcast, Apple, Netflix, etc.) and allows providers to generate revenue from online (non-linear) platforms. This invention also allows for the content planning, preparation and delivery to support OTT (over the top) video services.

The invention includes non-linear video asset program planning, preparation, and delivery systems. One example system includes a non-linear planning subsystem that receives a linear broadcast schedule from a linear schedule service system, receives content rights from a content rights system, and receives a source video asset from a storage device. The linear broadcast schedule can include an air date and time of the asset's linear broadcast distribution and can be used to determine the on-line distribution date of the source video asset. The content rights can include pricing and/or promotion of the distribution of the source video asset.

The non-linear planning subsystem generates a partner content avails and generates a metadata file of the source video asset that includes an updated metadata field related to distribution of the source video asset. The metadata files can be many types of files including word processing documents, spreadsheet files, text files, HTML files, XML files, and other files. The partner content avails generated by the planning subsystem identifies a video asset and distribution time and/or distribution territory and/or version (e.g., HD, foreign language, etc.) of the video asset. The planning system can automatically create a partner avails document based on partner content distribution dates, partner content rights, and the identified source video asset, and send the partner avails document to the distribution partners. The partner avails document can be sent to the distribution partners before the actual content.

The planning subsystem adds the source video asset to a playlist created using a planning user interface. The playlist feature of the planning subsystem can scale upwards or downwards so that a single playlist of source video assets can be prepared and delivered to more than one of the distribution partners via a one-to-many model.

The system of the invention also includes a preparation subsystem such as a non-linear asset preparation subsystem that creates a distribution partner metadata file and/or an image file representing the source video asset. The distribution partner metadata can include metadata characterizing many aspects of the source video asset, including a title of the source video asset, a description of the source video asset, a date and time of recording of the source video asset, a broadcast network to be recorded, a keyword related to the source video asset, a right of the distribution partner in the source video asset, platform compatibility of the source video asset, an activation date of the source video asset, a deactivation date of the source video asset, and other attributes.

The system of the invention also includes a transcoding subsystem, such as a non-linear asset transcoding subsystem that receives the source video asset from the preparation system, schedules transcoding of the source video asset, and transcodes the source video asset based upon a delivery date schedule. The transcoding schedule can be based on a number of items including a native frame rate of the source video asset, a cadence correction error rate in the source video asset, a time of day, a video codec, and other considerations. The transcoding can include creating closed caption files for the transcoded video asset, and the closed captions for the transcoded video asset can be timed to match the transcoded video file.

The systems of the invention also include a quality control subsystem, such as a non-linear asset quality control subsystem that examines the quality of the transcoded video asset, including native frame rates of a transcoded source video asset, lossy compression approximations of the transcoded video asset, audio encoding that accompanies the transcoded video asset, and other qualities of the transcoded video asset. The quality control subsystem can alert an operator when a quality control measure requires intervention or when an error requires correction.

The systems of the invention also include a delivery subsystem, such as a delivery subsystem that receives a transcoded source video asset, a metadata file, and a representative image related to the transcoded video asset and assembles the asset, the metadata file, and image into a distributable video asset. The metadata files can be many types of files including word processing documents, spreadsheet files, text files, HTML files, XML files, and others. The delivery subsystem also delivers ancillary materials with the video asset such as music cue sheets, extended metadata, extended images, and other ancillary materials along with the distributable video asset. The delivered (distributable) video asset matches up with the partner avails document that was sent to the distribution partner(s). More than one distribution partner may be distributing the video asset, and individual partner avails documents can be sent to each of the distribution partners for their distribution with the video asset. The distributable video asset(s) and the partner avails document(s) of the distribution partner(s) can include matching nonlinear asset identifiers to match up the specific partner avails document to the video asset.

The system of the invention can also include a workflow tracking service that identifies, tracks, and records states of the source video asset as the source video asset moves through the system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Previous generations of systems are limited in that they allow the scheduling and delivery of content, but do not include the planning process (which, in turn, feeds the downstream workflows). The invention integrates planning workflows into an orchestrated and efficient overall distribution of the video assets and related materials such as metadata, images, closed caption files, music cue sheets, and other distribution materials.

Figure 1A:
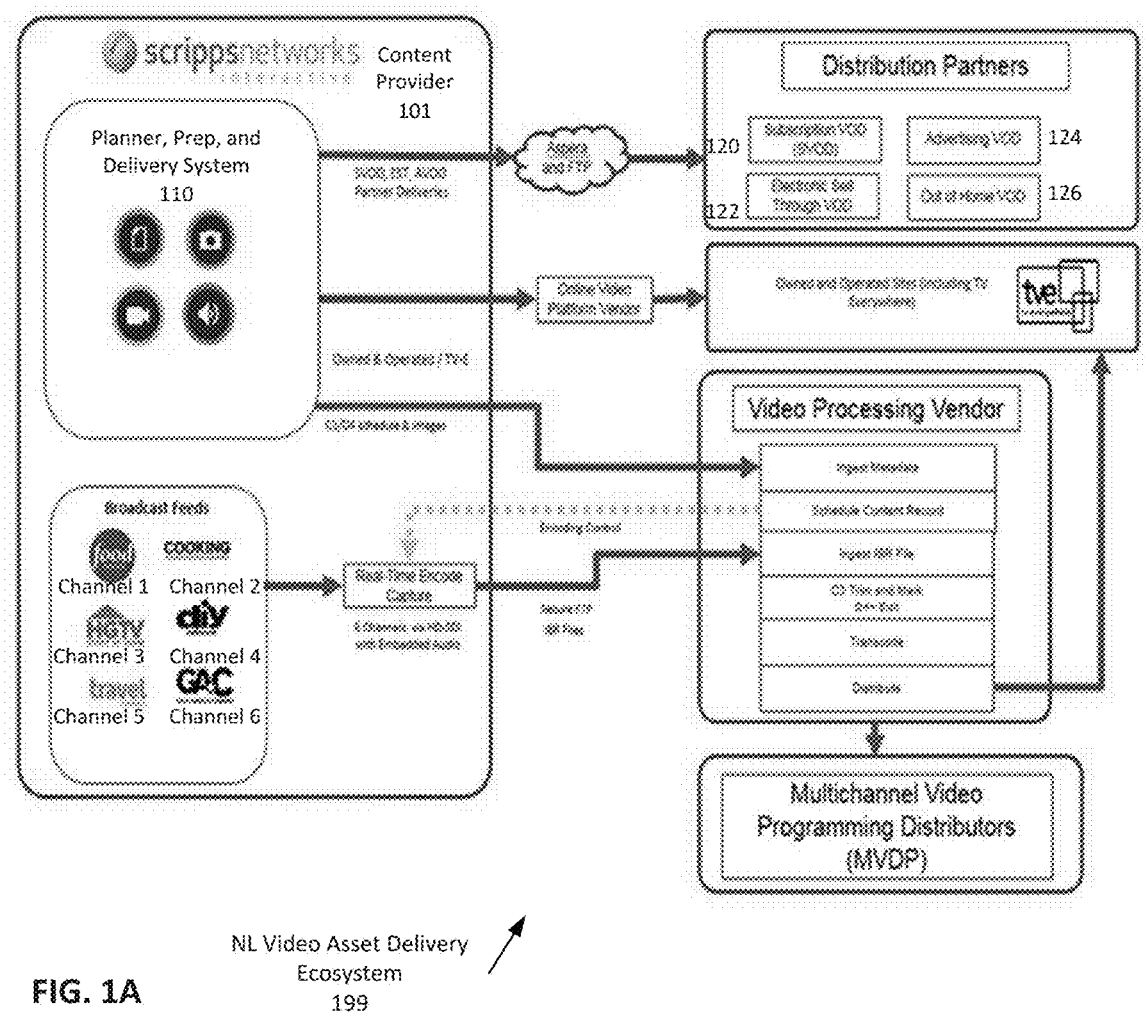
FIG. 1A shows a non-linear planning, preparation, and distribution system in accordance with the invention.

FIG. 1A shows an operational and business overview of the non-linear video asset delivery ecosystem 199 of the invention. The planning portion (hardware and software) of the system resides in the planner, prep, and delivery system 110. The non-linear video asset delivery ecosystem 199 manages media assets to allow for the timely delivery of content. Often, the cable television broadcasts are encoded and delivered to the various distributors (Apple, Google, Microsoft, etc.) and are listed for sale the next day.

Figure 1B:
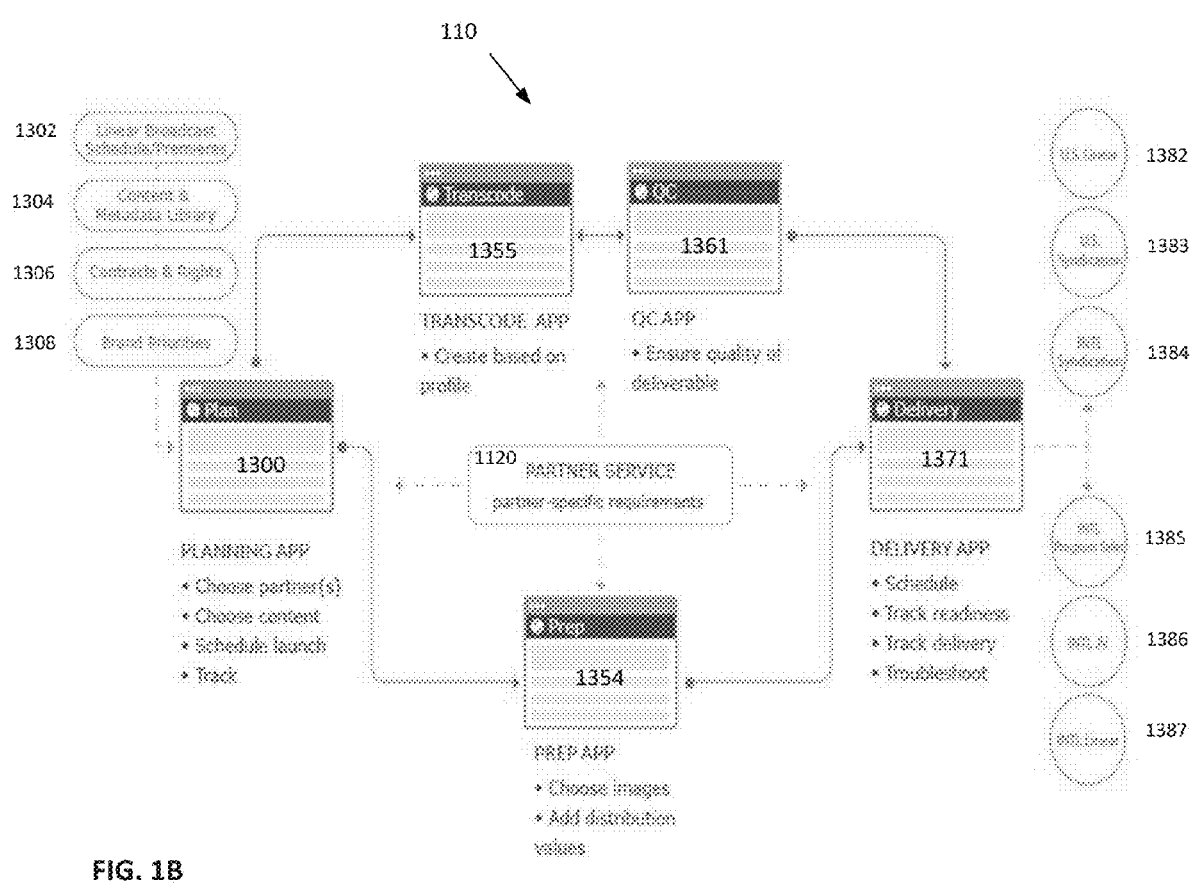
FIG. 1B shows a suite of application modules that provide the respective planning, preparation, transcoding, quality assurance, and delivery functionality of the invention.

FIG. 1B shows a suite of application modules that provide the respective planning, preparation, transcoding, quality assurance, and delivery functionality of the planner, prep, and delivery system 110. For example, while FIG. 1A shows the relationship of the planner, preparation, and delivery system 110 to the overall non-linear video asset delivery ecosystem 199, FIG. 1B breaks the functions of the system 110 into respective apps and modules, including planning app 1300, prep app 1354, transcode app 1355, quality control (QC) app 1361, and delivery app 1371.

As detailed further below, the planning app receives a linear broadcast schedule 1302, content and metadata from content and metadata library 1304, contract and rights information 1306, and brand priorities 1308 and works in conjunction with distribution partner service 1120 for use in planning the delivery of content, taking into account partner-specific requirements. In the planning app 1300, the system 110 chooses distribution partners, chooses content, schedules the content launch, and tracks the content.

The prep app 1354 also works in conjunction with distribution partner service 1120 to choose images and add distribution values to the prepared content. Transcode app 1355 receives the source video asset, schedules the transcoding, and transcodes the source video asset. The quality control (QC) app 1361 ensures that the system provides a quality transcoded asset, subject to partner-specific requirements. The delivery app 1371 works in conjunction with the partner service 1120 to schedule delivery of the assets, track readiness, track delivery, and troubleshoot delivery problems of the assets, taking into account U.S. linear deliveries 1382, U.S. syndicated content deliveries 1383, international syndicated deliveries 1384, international program sales 1385, international joint ventures 1386, and international linear deliveries 1387.

Figure 2:
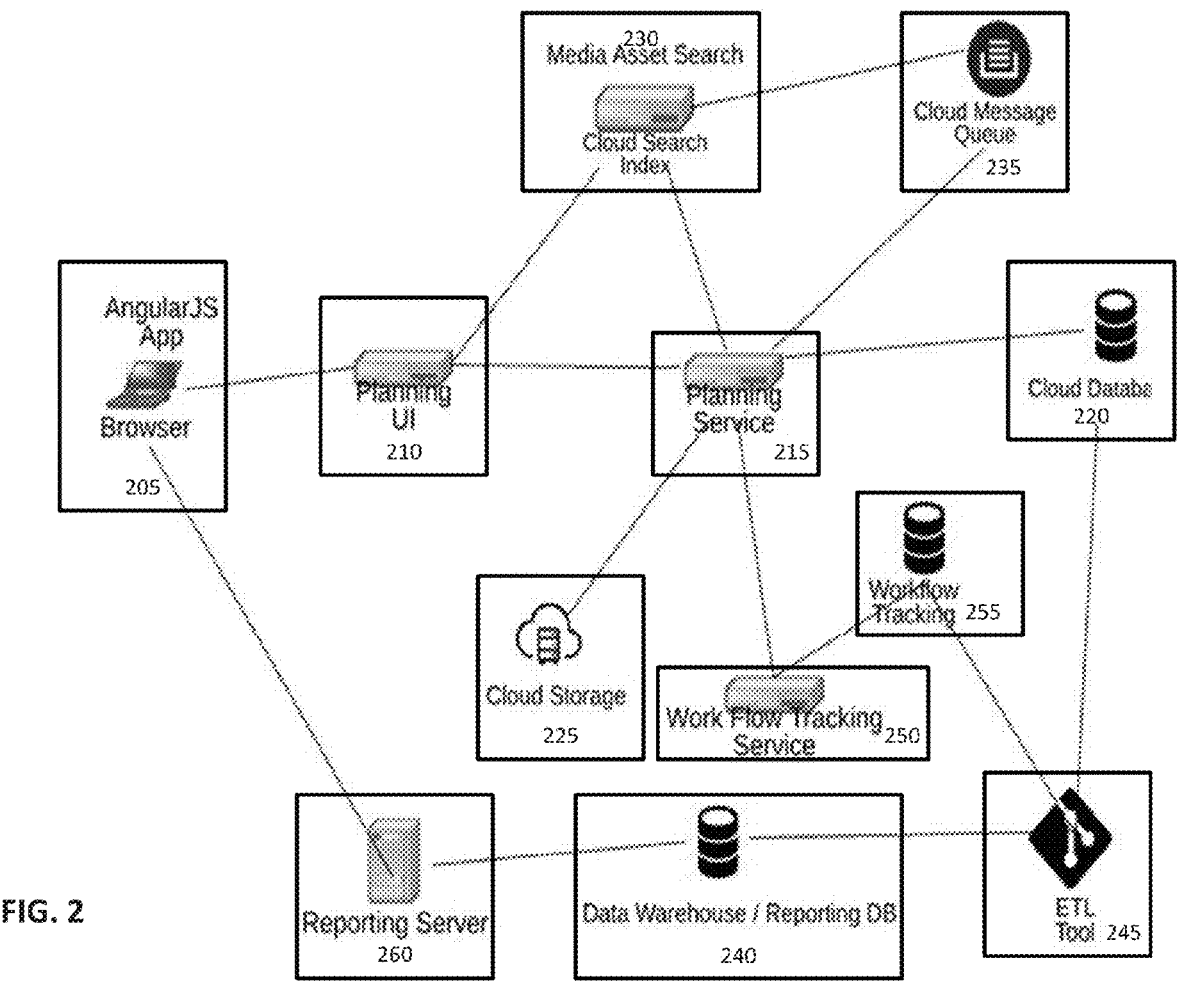
FIG. 2 shows a media asset management subsystem components, applications, and services that carry out non-linear planning processes of the invention.
Figure 3:
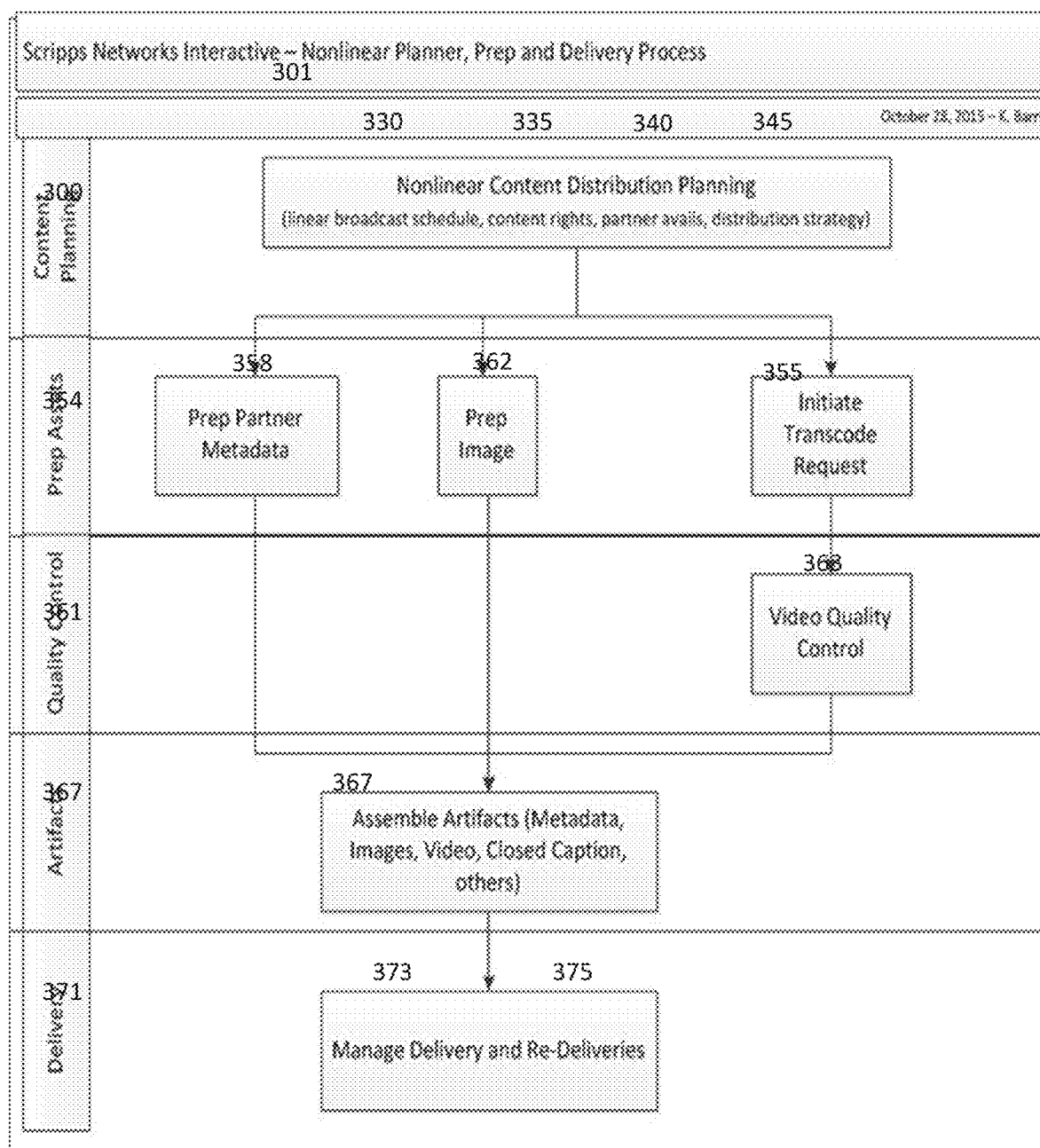
FIG. 3 shows a swim lane diagram of a non-linear planning, preparation, and delivery process of the invention.
Figure 4:
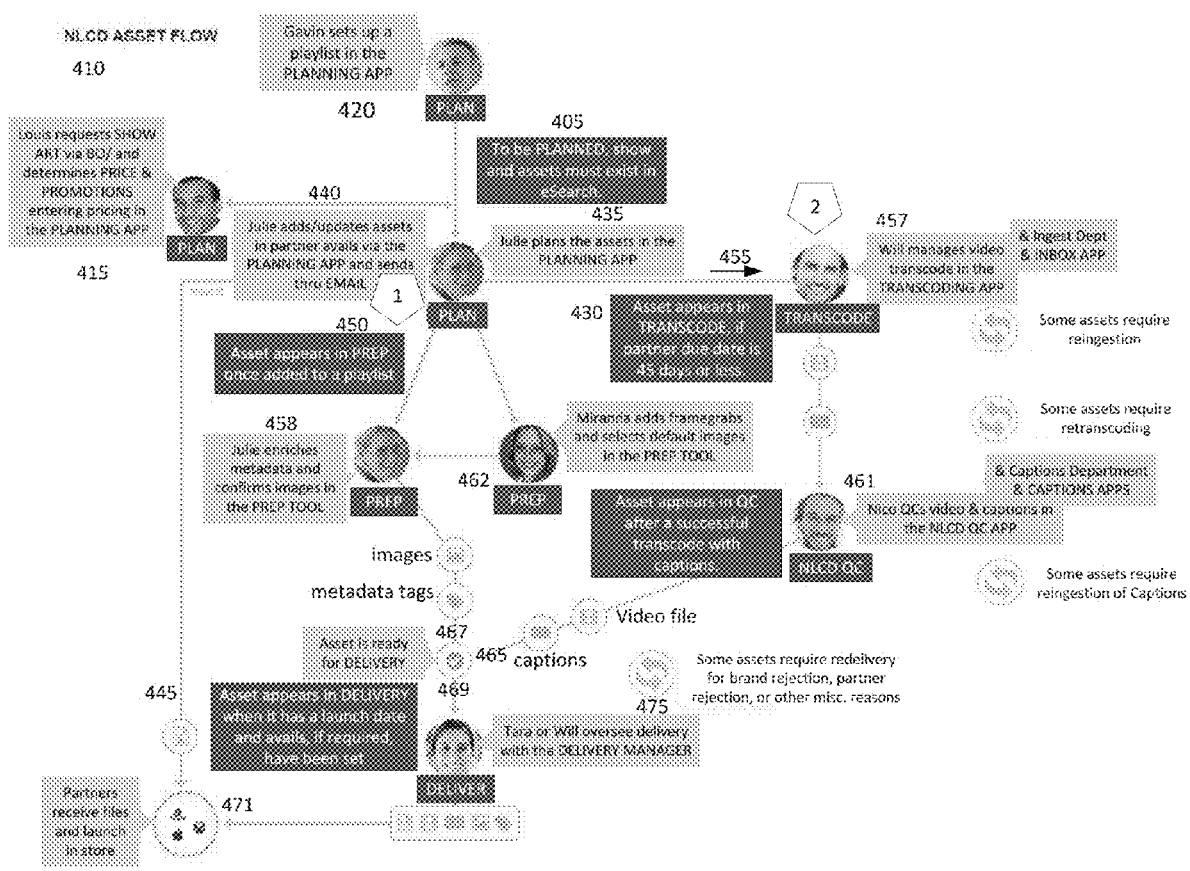
FIG. 4 shows a persona diagram of a non-linear planning, preparation, and delivery processes of the invention.

As shown in FIG. 2, the planner, prep, and delivery system 110 includes the components, applications, and services that carry out the planning process described in the diagrams of FIGS. 3-5. FIG. 2 illustrates the hardware and technical components used to instantiate the sources, apps, and distribution endpoints shown in FIG. 1B. Framework 205 and planning user interface 210 form the presentation layer and the business logic for the planning system and process. Framework 205 can include a JavaScript framework such as Angular JS, Angular s, Angular 2, ReactJS, Vue.js, Vue 2.0, Ember.js, Meteor.js, and the like. Framework 205 and planning user interface 210 provide end user facing features.

Planning service 215 supports the planning user interface 210 by receiving instructional calls and messages to be processed. Based on the message, via an application programming interface (API), the planning service responds with actions such as a database entry or database retrieval. Planning database (dB) 220 can be a cloud-based database that stores the content identifiers activation/deactivation dates, asset metadata, and discrete sets of metadata for each distribution partner.

Cloud storage 225 includes a cloud-based storage device (e.g., memory, hard drive, server farm, etc.) such as a public cloud-based storage device for customized databases to support the planning process and to generate reports. Media asset search (MAS) 230 provides a search index of the assets (e.g., video, documents, files, and the like) by way of metadata, images, and/or asset type.

Message queue 235 includes a queue service that stores messages (data transported between the sender application and the receiver application) as the messages travel between applications or services in the system. The message queue includes a sequence of work objects that are waiting to be processed. Data warehouse/reporting database 240 is a repository of data used to create analytics. The data stored in data warehouse/reporting database 240 is used to discover, interpret, and communicate patterns in the data and is stored and accessed via reporting server 260.

Extract transform and load (ETL) tool 245 provides processes for database usage and warehousing where data is extracted from homogeneous or heterogeneous data sources, transformed for storing in the proper format or structure for querying and analysis, and loaded into the target database. The tool 245 runs when moving raw data from its source to the data warehouse/dB 240.

Workflow tracking service 250 identifies and tracks the state of an asset in the workflow from the planning stage through the preparation stage to quality control and delivery stages. The service 250 tracks the lifecycle of the asset from planning, prep, and delivery. Other services in the system 110 can deposit and/or retrieve the asset status from this service. Workflow tracking database 255 stores the tracked asset states for retrieval and distribution by the service 250.

FIGS. 3-6 outline a non-linear planner, preparation, and delivery process performed by the system 110 of the claimed invention to provide video content to non-linear platforms and/or over the top (OTT) video services.

The process starts when a distribution partner, such as a subscription video-on-demand partner 120 (see FIG. 1), electronic sell-through partner 122, advertising video-on-demand partner 124, out of home video-on-demand partner 126, and the like, is entitled to content from the content provider 101. The relationship between the content provider 101 and the distribution partners 120, 122, 124, 126 typically exists as a contractual commitment, where the content provider 101 provides video assets to the distribution partners 120, 122, 124, 126, with stipulated asset titles, quantities, formats, timing, video related images, content metadata and technical metadata, volumes of assets delivered per time unit (i.e. week or month), and other specifications that may be contractually required of the video asset provider by the distribution partners.

FIGS. 3-6 illustrate the non-linear planning, preparation, and delivery process performed by the planner, prep, and delivery system 110 in FIGS. 1A-1B. FIGS. 3-5 show like actions with like reference numerals. In FIG. 3, the content planning application 300 directs the system to perform nonlinear content distribution planning in block 301. A content provider 101 selects content by searching for video assets (i.e., content) and placing the video assets in a distribution "partner" playlist 600 as shown further in the example planning user interface screen of FIG. 6A. As detailed further in the persona diagram of FIG. 4 and the flow chart of FIG. 5, in block 505, the programming team sets up a playlist 600 in which the video asset(s) 602 will reside in cloud database 220 by searching and identifying a particular asset based upon title 604, content, host, actor, time, linear premiere date 606, marketing commitments, and new platform launches 608. The planning service 215 searches and identifies the video asset 602 by metadata tags of the video asset. Once the planning service 215 identifies the asset 602, the planning service 215 receives the show art in block 510. In block 515, the system determines pricing and promotions for the video asset. As the planning process moves forward, the planner, prep, and delivery system 110 modifies the files of the video asset, including the video file (via transcoding), the image file (via resizing), and the metadata (via XSLT XML transformation to include the updated fields (e.g., show art, pricing and promotion, marketing priority tags, activation and deactivation dates, and other fields. Once the attributes of the video, XML, and image files are associated and linked to the video asset, in block 520, the system joins the video asset to the playlist 600. Upon determining whether additional assets will be added to the playlist in block 525, the system 110 continues to add assets by returning to block 505 until the playlist 602 is complete. Once the playlist 600 is complete, the playlist 600 resides in the collection of playlists as shown in FIG. 6B.

In blocks 330 and 530, respectively, the planner, prep, and delivery system 110 determines and displays a linear broadcast schedule (air date) and aligns the online activation date 608 accordingly. That is, the on-line video assets may not be available to viewers from the distribution partners 120, 122, 124, 126 simultaneously on the broadcast date. For example, some online assets are available immediately after the broadcast schedule airdate and can be purchased by viewers at that time. Likewise, other online assets or other versions of the same online asset can be viewed, via pay TV authentication, starting the next day. During the first three (3) days after the original broadcast airdate, the content includes the full advertising load (i.e., C3 content). Similarly, other versions of the online asset can be accessed by viewers four days or after from the broadcast schedule airdate (i.e., D4+ content) with a reduced ad load via dynamic ad insertion (DAI).

In blocks 335 and 535 respectively, the system checks the distribution partners and platform, the content itself, and other partner-related and content-related rights to make sure that content has the outbound rights for that platform. The rights can be different for different versions of the same underlying asset. In blocks 340 and 540, respectively, the system 110 then automates and generates the partner avails document, which the system sends in blocks 345 and 545 to the partner before the actual content is delivered. Sending the partner avails document identifies an asset and confirms the partner distribution strategy for the asset. The partner avails document includes business information regarding the availability of the offered assets and provides information about the time, location, and business rules related to the offered asset. For example, the avails document can include information for standard-definition (SD) and high-definition (HD) versions, for video-on-demand (VOD) and electronic sell-through (EST) licenses, for the availability of the content in different territories, and the like. At the same time, the system forwards the asset to the preparation subsystem in block 550 and to the transcoding subsystem in block 555.

Figure 5A:
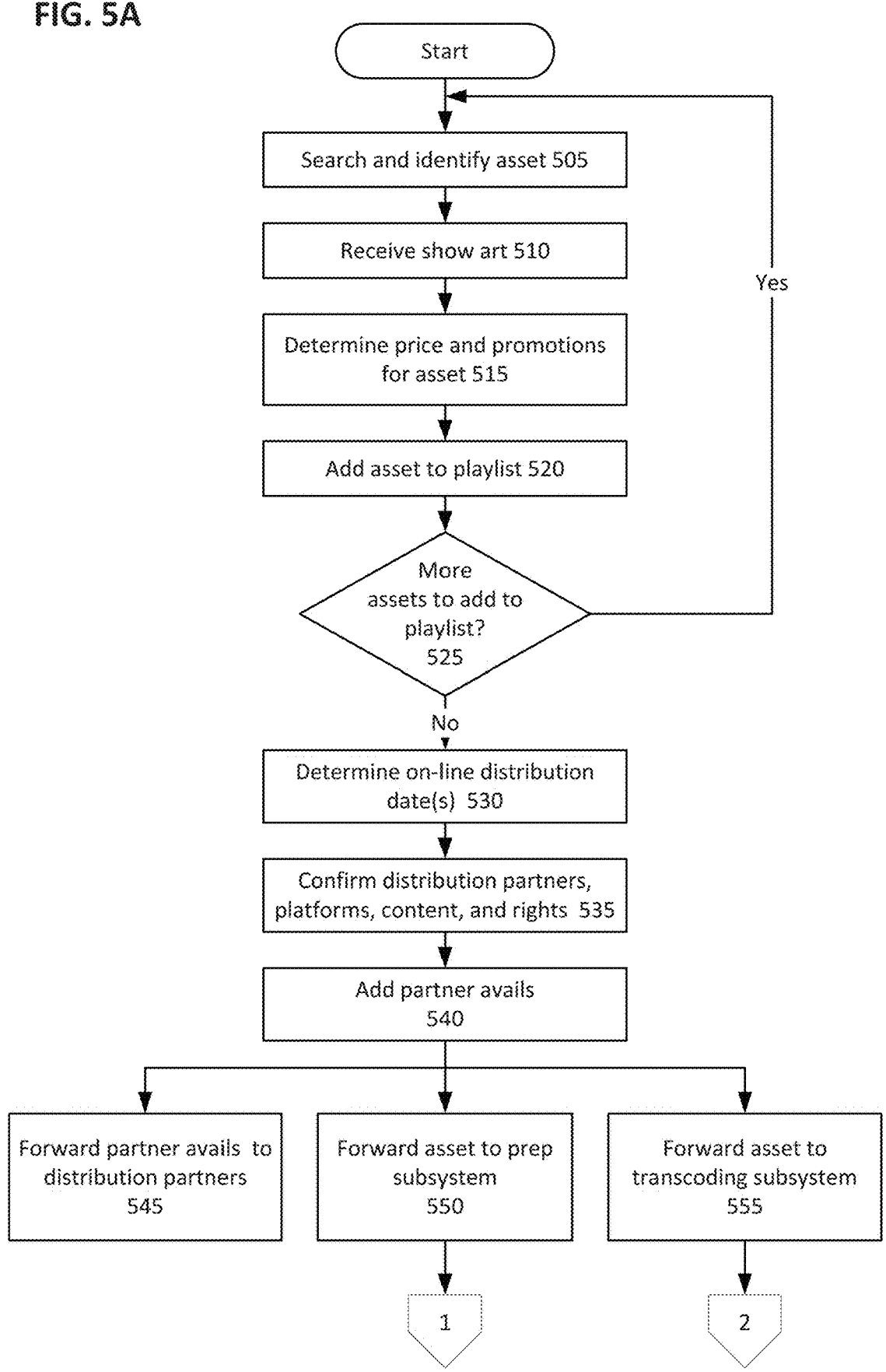
FIGS. 5A-5B show a process flow of a non-linear, planning, preparation, and delivery process of the invention.
Figure 5B:
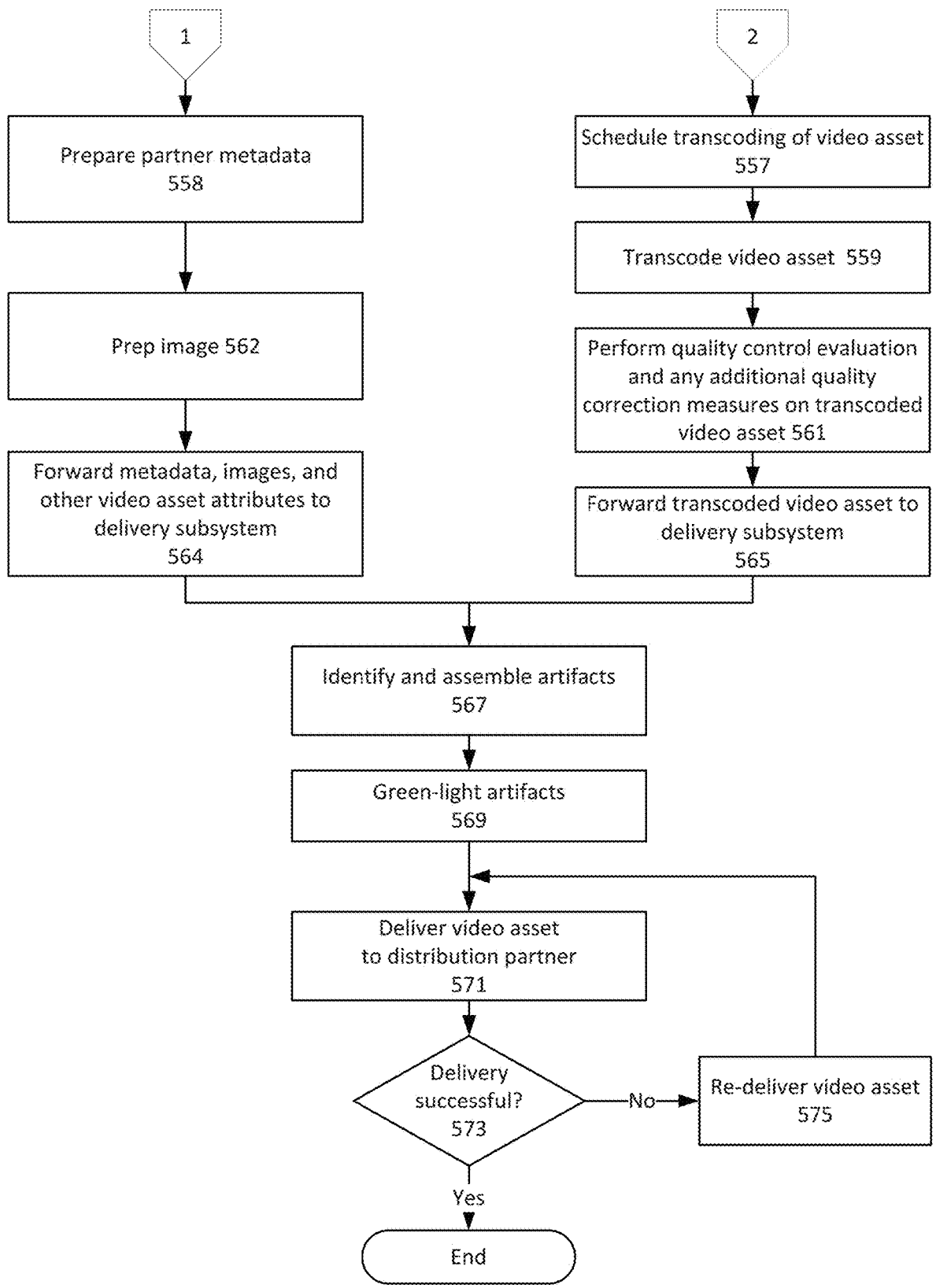
Figure 6A:
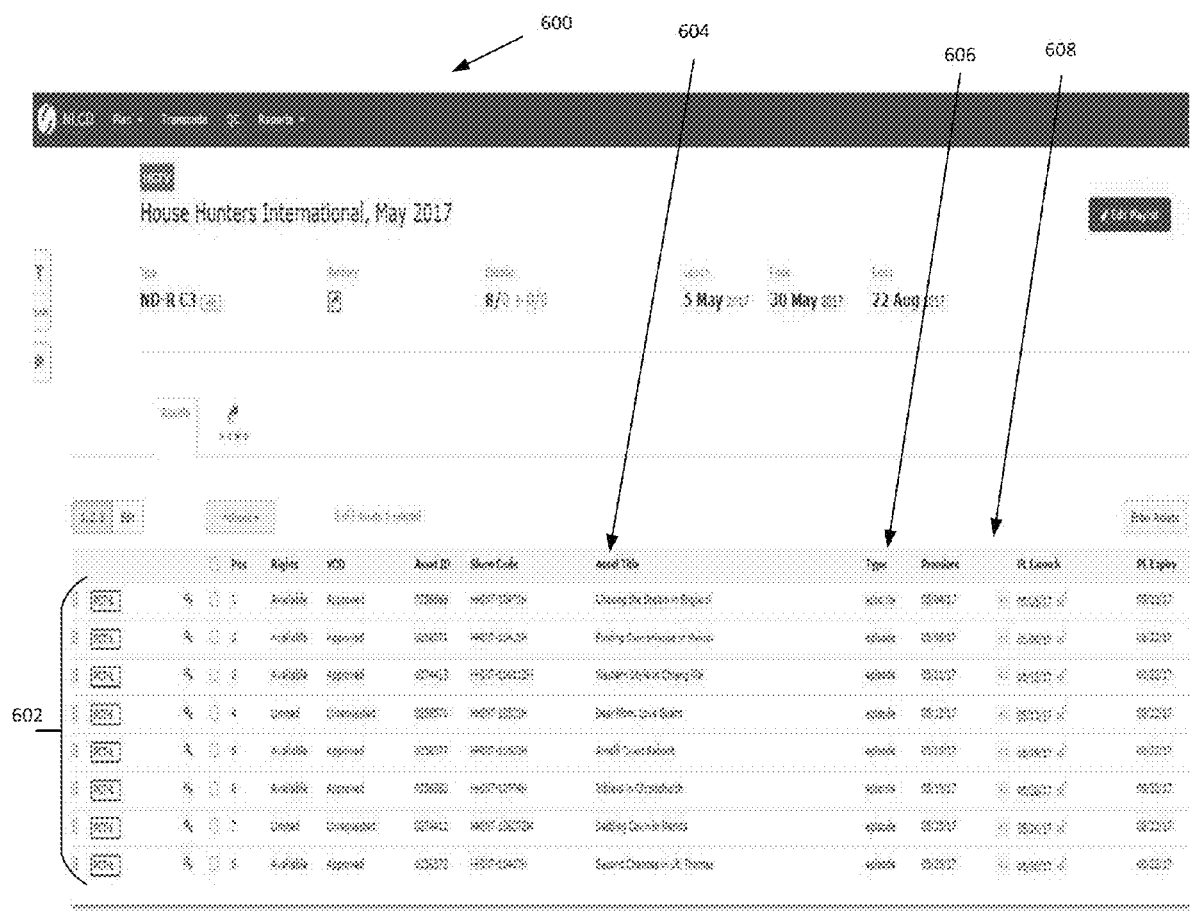
FIGS. 6A-6F are example user interface screens showing a manner in which a non-linear planning, preparation, and delivery system of the invention operates on media content.
Figure 6B:
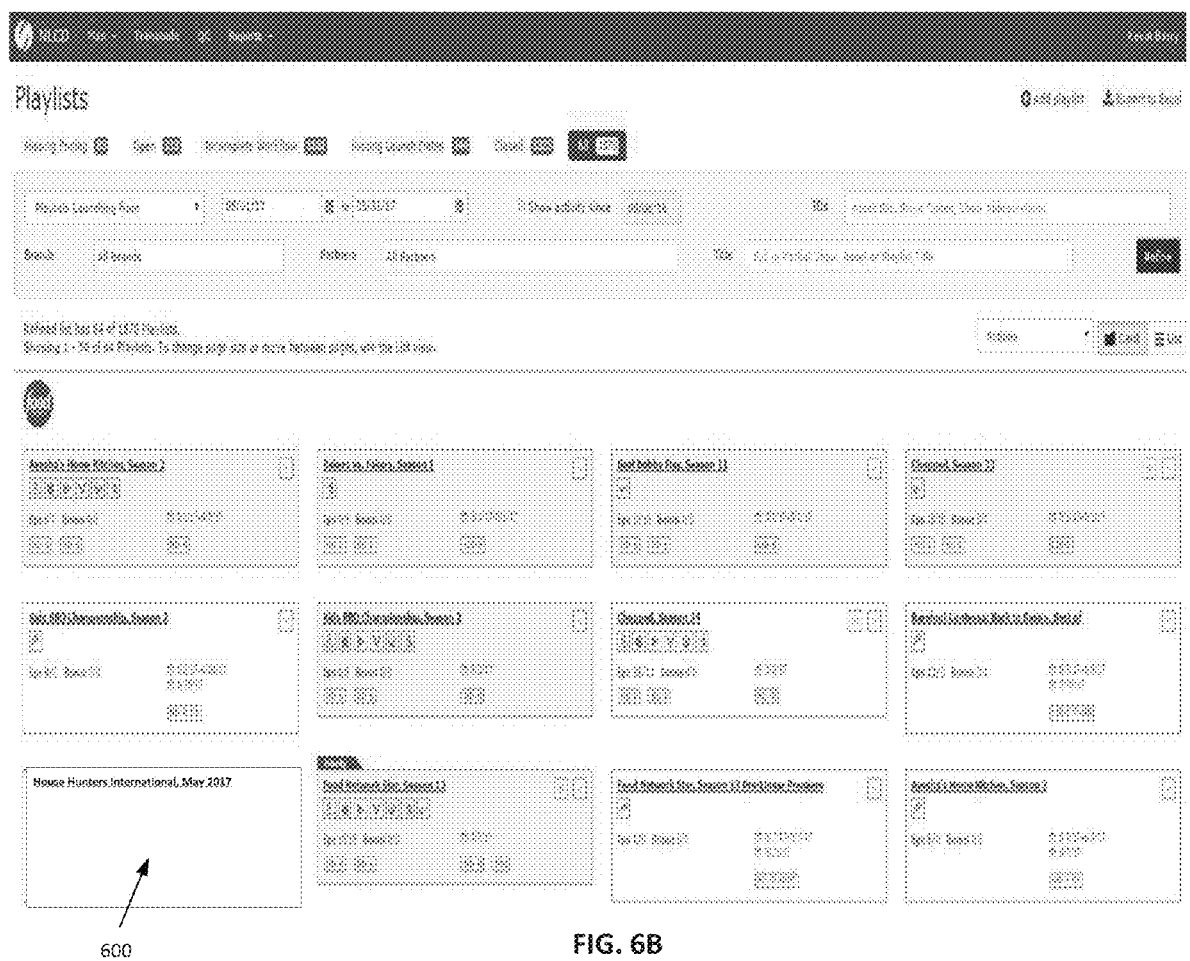
Figure 6C:
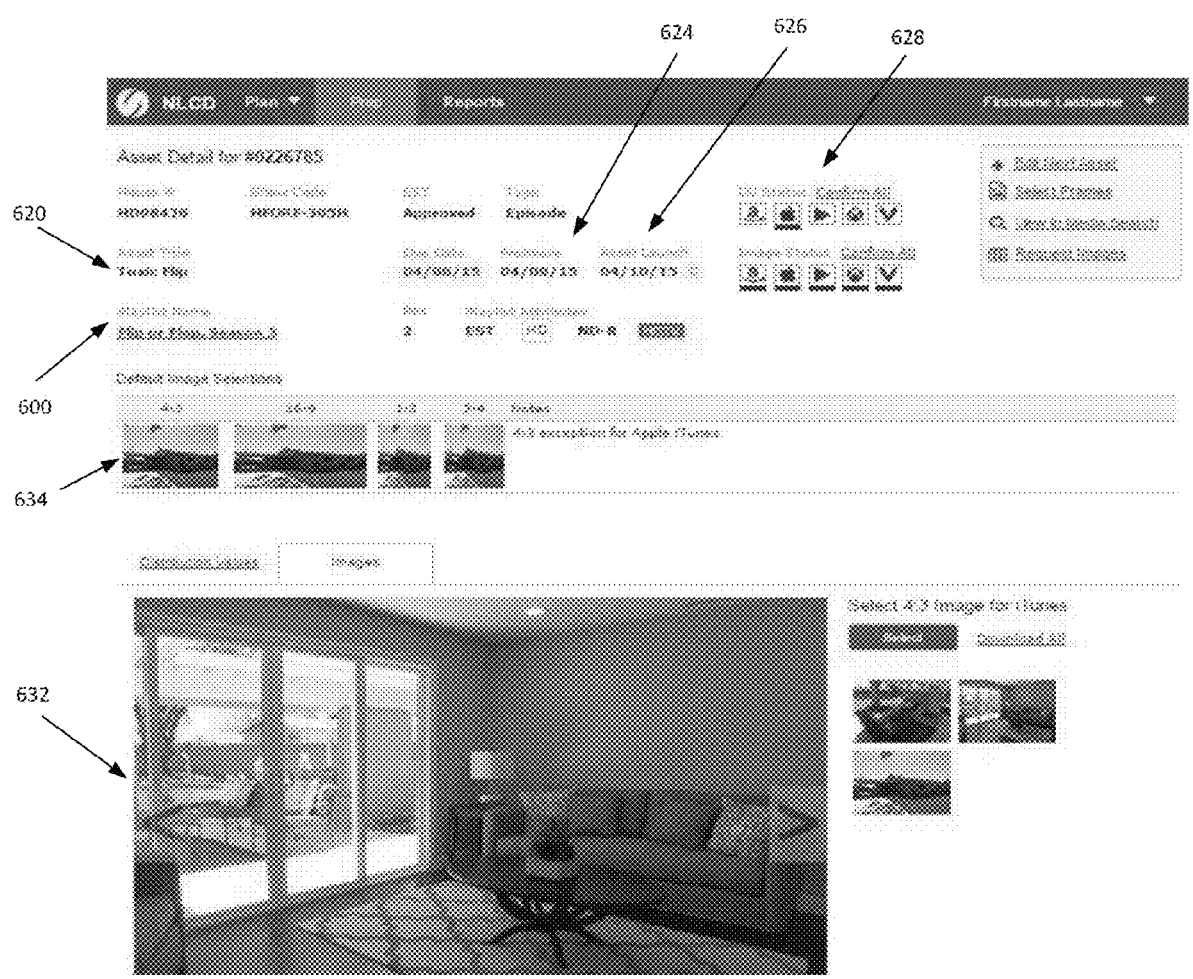
Figure 6D:
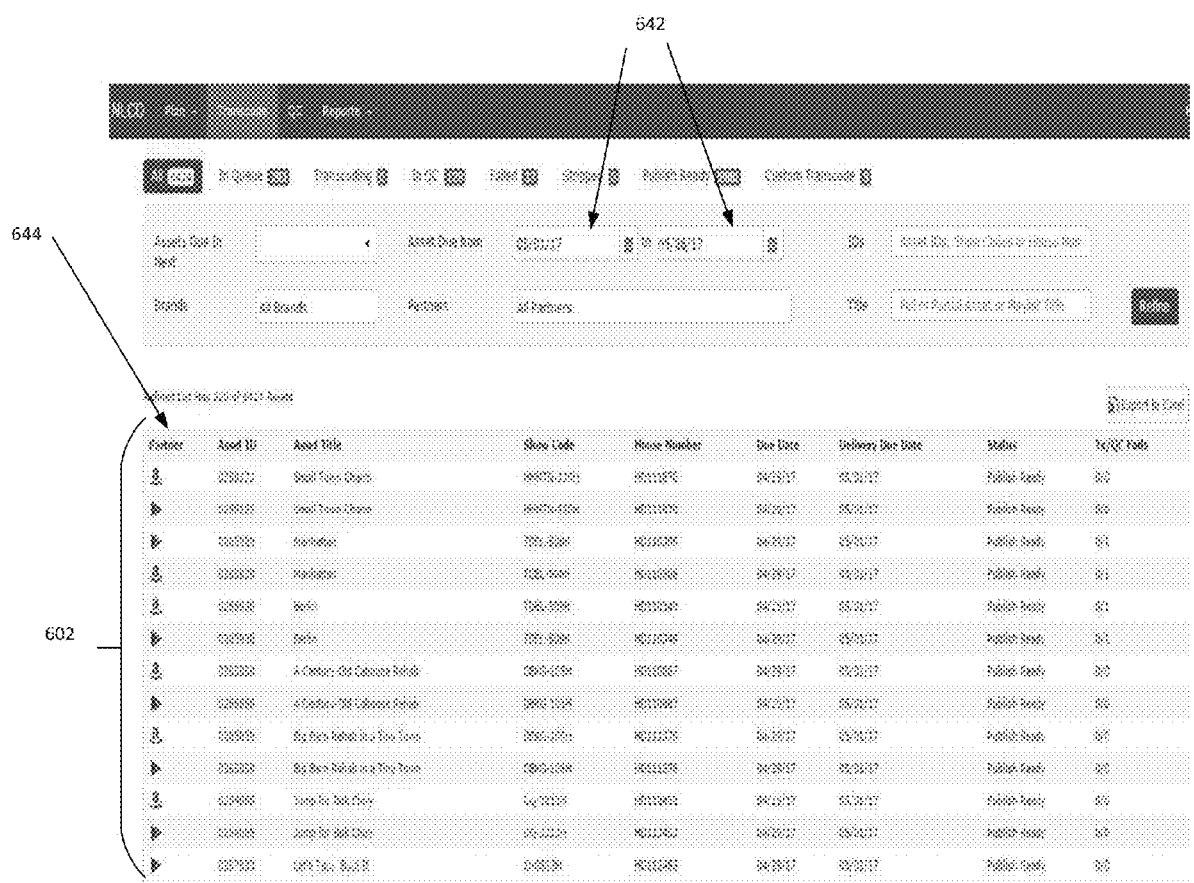

Following the flow diagram path from block 550 in FIG. 5A to reference block 1 in FIG. 5B, once the planning operations are complete, the system 110 prepares the assets in block 354 (in FIG. 3) where the partner metadata is prepared in block 358 and block 558, respectively. The system prepares the partner metadata by editing and updating metadata specific to that partner. For example, as also shown in FIG. 6C, the system edits, updates, and embeds metadata related to the titles 620 and descriptions, dates and times of the recording, of the broadcast network to be recorded, keywords, rights in the asset, platform compatibility, activation and deactivation dates 624, 626 for the distribution partner to honor, and other video asset information for a specific partner site 628. Often the partners have to adhere to custom metadata specifications as part of the video asset provider-distribution partner contract. By editing, updating, and embedding the partner metadata, contextual information regarding the video asset can be ascertained, cataloged, indexed, and retrieved.

As part of the video asset preparation, the system preps the image 632 in blocks 362 and 562, respectively. The image prep subsystem selects an image 632 (from image selections 634) that best represents that video on that specific partner site. The image prep can be an image grab from the video asset itself or can be another visual representation indicative of that video on that partner site. Once the system 110 completes the partner metadata prep 558 and the image prep 562, the system forwards the metadata, images, and other video asset attributes to the delivery subsystem in block 564.

Meanwhile, in parallel to the partner metadata prep 558 and the image prep 562, the system 110 forwards the video asset to the transcoding subsystem and initiates a transcoding request in block 355 and block 555, respectively. Following the flow diagram path from block 555 in FIG. 5A to reference block 2 in FIG. 5B, the system 110 receives the source video asset and schedules transcoding of the source video asset 602 in block 557. As also shown in the transcoding system user interface example of FIG. 6D, the scheduling of the transcoding can be based on the delivery due dates 642 of the assets 602. Based on a threshold of data, such as native frame rate of the source video asset or the cadence correction error rate in the source video asset provided on the asset, the system will transcode the source video asset 602 in block 559. The transcoding can include converting the asset from one video codec form to another. For example, a program can be broadcast at one resolution and can be provided to a partner site at a different resolution. The system 110 normalizes the load on the transcoding subsystems by efficiently moving non-urgent content to be transcoded during off peak hours (such as nights and weekends).

Figure 6E:
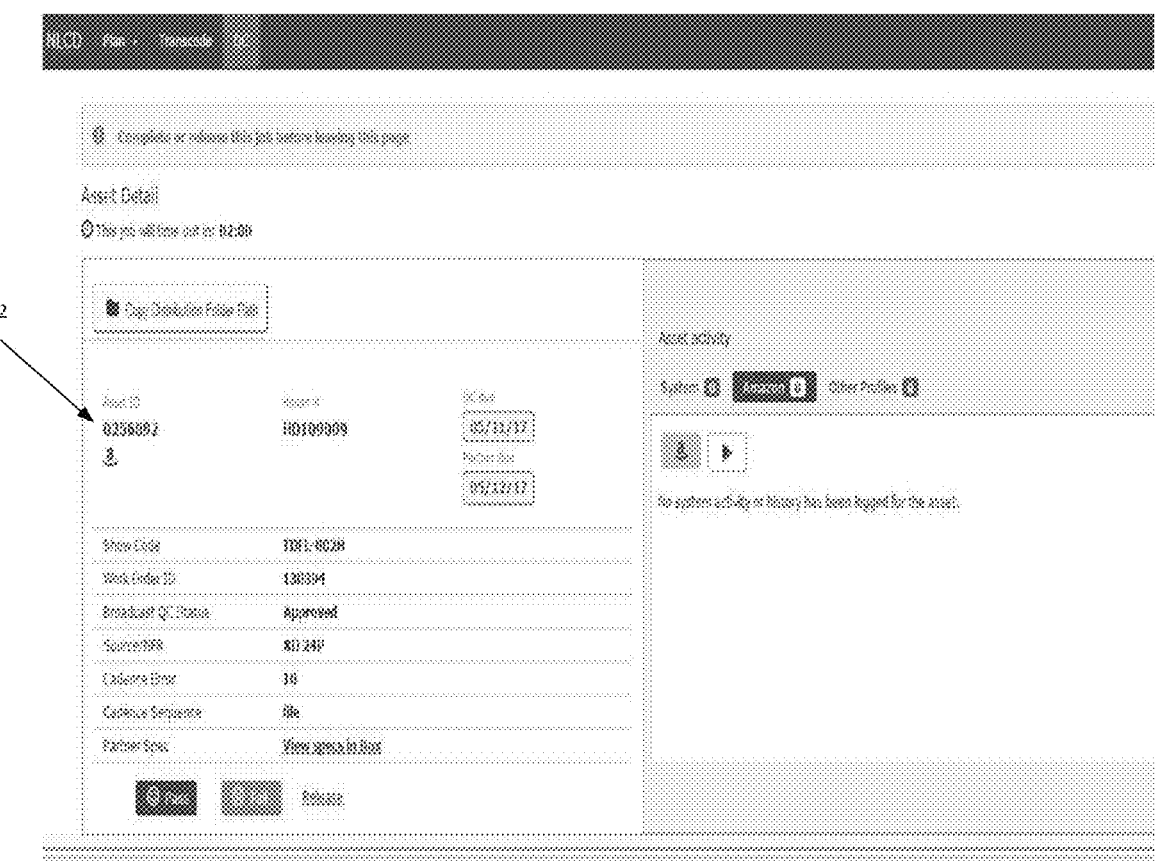
Figure 6F:
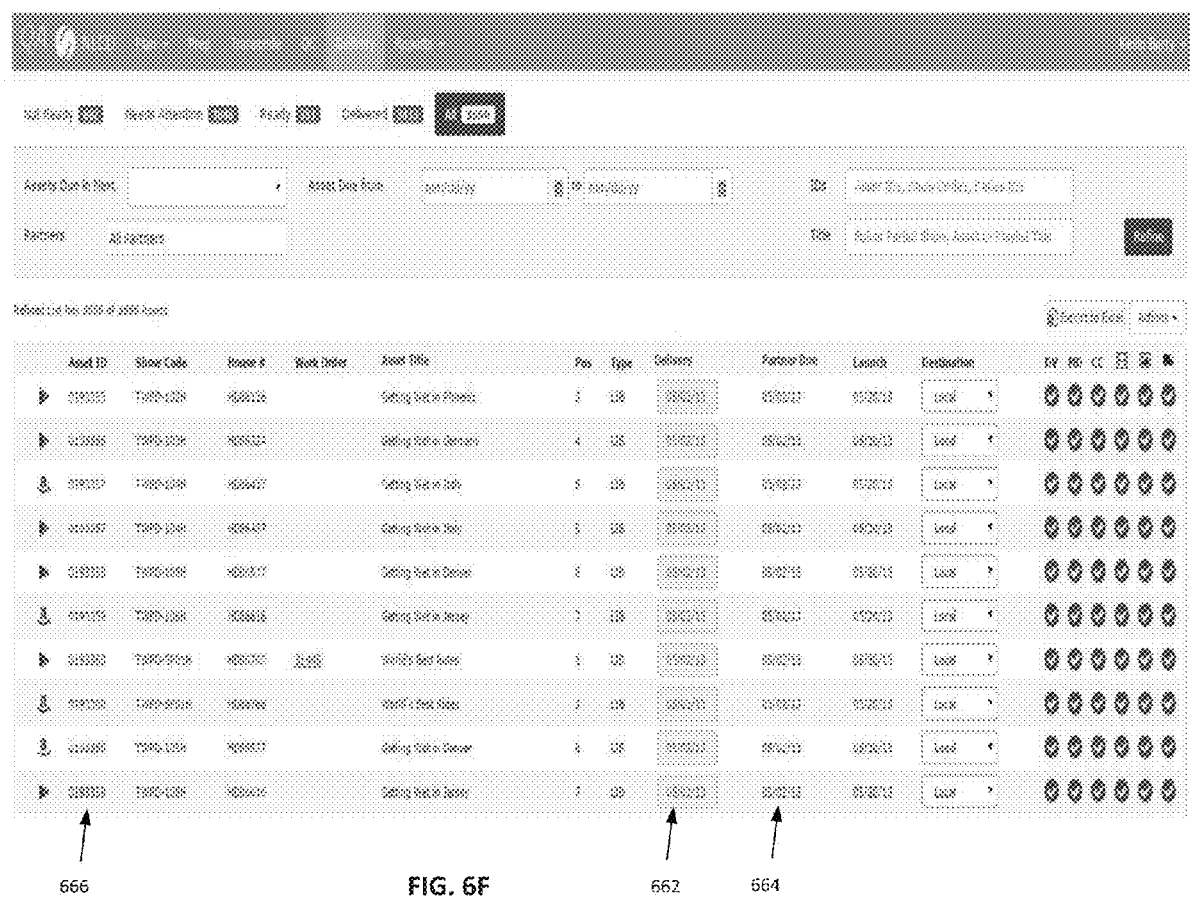

Once the video asset is transcoded, the system performs quality control measures in block 361 and 561, respectively. For example, in block 363, the quality control subsystem confirms that the transcoding is not too lossy. FIG. 6E shows a detailed user interface for the quality control operations. The quality control subsystem also examines native frame rates, identifies and corrects audio issues, and alerts system operators when the transcoded asset requires additional intervention. The system can take quality control measures more quickly than in the past, as the video assets are moving in parallel through the prep and transcoding subsystems.

Depending upon the type of quality problem evident in the transcoded video asset 602, some video assets may require re-ingestion, that is, recapturing, transferring, or importing the video asset file into the transcoding subsystem. Other video assets may require logging of additional descriptive comments to provide additional information to video asset provider personnel who will handle the asset in the future. Other video assets may require re-transcoding to produce a new set of renditions, frame settings, timings, while still others may require re-ingestion of captions or other video overlay materials. Once the system completes the quality control measures, the transcoded video asset is forwarded to the delivery subsystem in block 365 and block 565, respectively, where it meets up with the forwarded metadata, images, and other video asset attributes from the preparation subsystem.

In block 367 and block 567, respectively, the system 110 identifies and assembles artifacts. For example, the system assembles the metadata and representative image from the prep subsystem and the video file and captioning information from the transcoding and quality control subsystems, as well as encryption files and other artifacts. The system 110 tracks artifacts and monitors the state of each of the artifacts through the subsystems with the reporting server 260. The system 110 stores the states of the artifacts in the data warehouse/reporting database 240 for subsequent analysis. Once the system 110 identifies the artifact (component) of the video asset as technically sound and ready, the system 110 green-lights that artifact (component). The system 110 verifies a video asset launch date/time and verifies that the partner avails have been sent to the distribution partner 120, 122, 124, 126. When the system 110 green lights all the artifacts (components) in block 569, the asset is ready for delivery.

In block 571, the delivery subsystem delivers the XML or JSON files (e.g., the partner avails document and the prepped partner metadata, etc.), the image from the prep subsystem, and the transcoded and quality-assured video file to the distribution partners 120, 122, 124, 126 for distribution over multiple platforms. As further shown in the delivery user interface of FIG. 6F, the system 110 can also include additional ancillary materials that accompany the video asset, such as closed captions, music queue sheets, recipes, timing sheets, and the like. While the system can deliver the video asset to the distribution partners 120, 122, 124, 126 as soon as the system green lights all the artifacts, the system can also schedule delivery to the distribution partners so the asset is not delivered too early or too late to the partner. The system can track the due date 664 for delivery to the distribution partners 120, 122, 124, 126 and the delivery date 662. The system optimizes the delivery date based on the date of the asset activation on the partner site. Similarly, the system can schedule delivery of the video asset during times of reduced network traffic or during times of reduced cost network transfers. Once the system delivers the content to the partner, a nonlinear asset ID 666 is used to associate the content to the asset metadata, which was delivered to the partner via the avails document. The avails document is typically sent prior to the arrival of the video content.

The non-linear program planner, preparation, and delivery system performs multiplatform planning and scheduling for content being delivered to multiple content delivery platforms. The system coordinates end-to-end planning to deliver high-quality video content in a very efficient and scalable manner. The system includes automated partner content avails and other processes that increases the accuracy of the information provided to distribution partners. The system checks on content rights and incorporates metadata structures that facilitate delivery of content to a wide range of distribution channels. The invention increases accuracy, timeliness, and efficiency of content delivered to partners and allows providers to generate revenue from online (non-linear) platforms and over the top (OTT) video services.

We claim:

1. A method for program planning, preparation, and delivery of a non-linear video asset, the method comprising:
receiving a linear broadcast schedule from a linear schedule service application into a non-linear planning application;
receiving content rights from a content rights application into the non-linear planning application;
receiving a source video asset from a storage device into the non-linear planning application;
generating a partner content avails with the non-linear planning application;
generating a metadata file of the source video asset with the non-linear planning application, wherein the metadata file of the source video asset includes an updated metadata field related to distribution of the source video asset;
adding the source video asset to a playlist created using a planning user interface;
automatically creating a partner avails document based on partner content distribution dates, partner content rights, and the identified source video asset; and
sending the partner avails document to distribution partners.

2. A method of claim 1, wherein the metadata file is at least one selected from the group of a word processing document, a spreadsheet file, a text file, an HTML file, and an XML file.

3. A method of claim 1, wherein the linear broadcast schedule determines an on-line distribution date of the source video asset.

4. A method of claim 1, wherein the content rights include at least one selected from the group of pricing and promotion of distribution of the source video asset.

5. A method of claim 1, wherein the playlist of source video assets created using the planning user interface scales for preparation and delivery of the playlist to a plurality of video content distribution partners via a one-to-many model.

6. A method of claim 1, wherein the partner content avails identifies a source video asset and at least one selected from the group of time of non-linear distribution of the source video asset, territory of distribution of the source video asset, and version of the source video asset.

7. A method of claim 1, wherein the partner avails document is sent to the distribution partners before sending the source video asset.

8. A method of claim 1 further comprising:
creating, with a non-linear asset preparation subsystem server, at least one selected from the group of a distribution partner metadata file and an image file representing the source video asset.

9. A method of claim 8, wherein the distribution partner metadata file includes metadata characterizing at least one selected from the group of a title of the source video asset, a description of the source video asset, a date and time of recording of the source video asset, a broadcast network to be recorded, a keyword related to the source video asset, rights of the distribution partners in the source video asset, platform compatibility of the source video asset, an activation date of the source video asset, and a deactivation date of the source video asset.

10. A method of claim 1 further comprising:
receiving the source video asset from a preparation subsystem server into a non-linear asset transcoding application;
scheduling transcoding of the source video asset with the non-linear asset transcoding application; and
transcoding the source video asset with the non-linear asset transcoding application based upon a delivery date schedule.

11. A method of claim 10, wherein transcoding the source video asset is based upon at least one selected from the group of a native frame rate of the source video asset, a cadence correction error rate in the source video asset, a time of day, and a video codec.

12. A method of claim 10 further comprising:
creating closed caption files for the transcoded video asset with the non-linear asset transcoding application.

13. A method of claim 10, wherein scheduling and transcoding of the source asset includes normalizing a transcoding workload by scheduling non-urgent transcoding to off-peak hours.

14. A method of claim 1 further comprising:
examining, with a non-linear asset quality control application, at least one selected from the group of native frame rates of a transcoded source video asset, lossy compression approximations of the transcoded video asset, and audio encoding that accompanies the transcoded video asset; and
alerting a system operator with the non-linear asset quality control application when an error requires correction.

15. A method of claim 1 further comprising:
receiving a transcoded source video asset, a metadata file, and a representative image related to the transcoded source video asset with a delivery application; and
assembling the transcoded source video asset, the metadata file, and the representative image into a distributable video asset.

16. A method of claim 15, wherein the delivery application assembles and delivers at least one selected from the group of music cue sheets, extended metadata, and extended images with the distributable video asset.

17. A method of claim 15, wherein the distributable video asset corresponds to a delivered partner avails document of a distribution partner.

18. A method of claim 17, wherein the distributable video asset and the partner avails document of the distribution partner include a matching nonlinear asset identifier.

19. A method of claim 1 further comprising:
Identifying, tracking, and recording states of the source video asset with a work flow tracking service as the source video asset moves through the system.

20. A method of claim 1 further comprising:
identifying and tracking, by a workflow tracking service, a state and lifecycle of the source video asset as the source video asset proceeds through the applications.

* * * * *